May 8, 1934.  N. B. GREEN  1,957,884
SPINDLE FOR A REELING DEVICE
Filed Feb. 19, 1931
Fig.1.
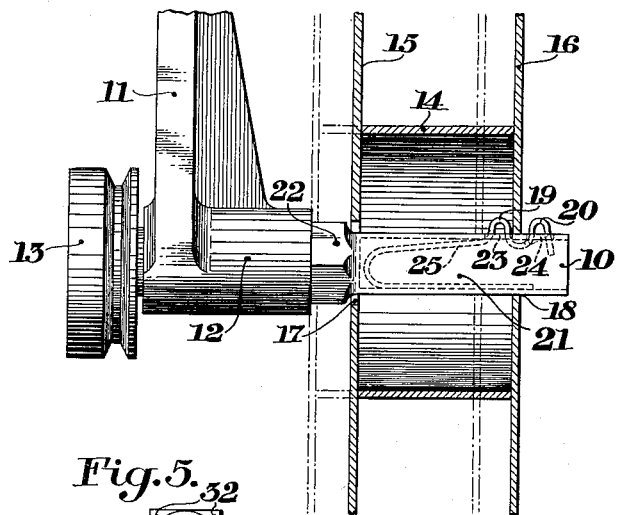
Fig.2.
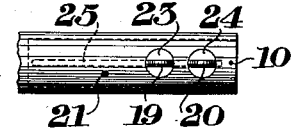
Fig.5.
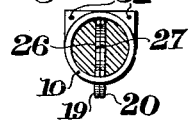
Fig.4.   Fig.3.
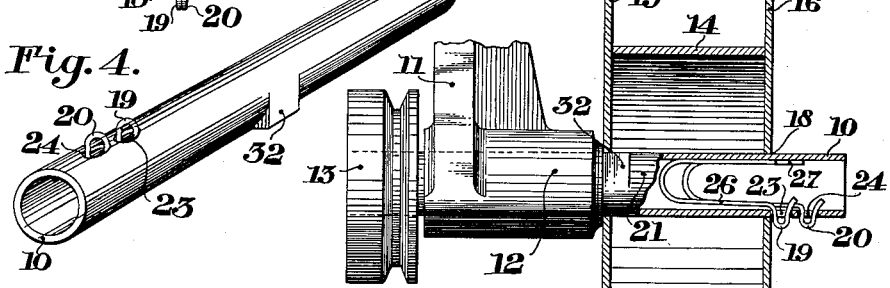
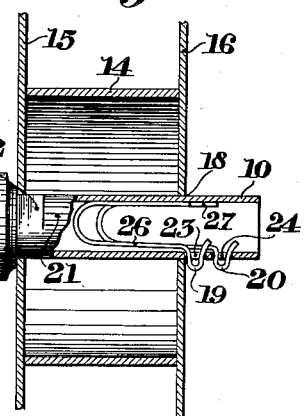
Fig.6.
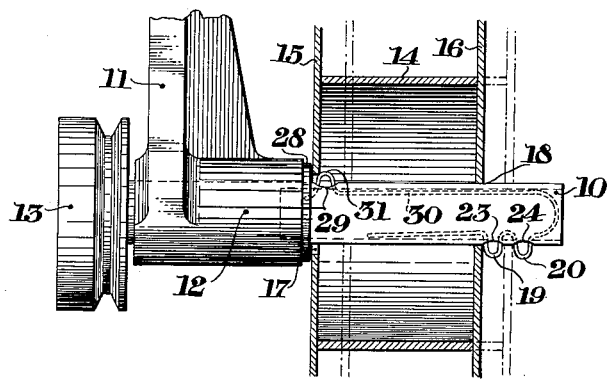
Fig.7.
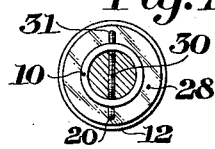
Inventor
Newton B. Green,
By
W. M. Perriss
George A. Gillette, Jr.
Attorneys Patented May 8, 1934

1,957,884

UNITED STATES PATENT OFFICE 1,957,884

SPINDLE FOR A REELING DEVICE

Newton B. Green, Rochester, N. Y., assignor to Eastman Kodak Company, Rochester, N. Y., a corporation of New York Application February 19, 1931, Serial No. 516,859

17 Claims. (Cl. 242—71)

This invention relates to a spindle for a reeling device and more particularly to a spindle for photographic spooling means.

Considerable inconvenience or complication attends the change in a reeling device to disconnect a positively driven spooling means from a spindle for free rotation thereon, such as the take-up spindle and reel in a motion picture projector. Heretofore it has been customary to effect this change quite awkwardly by manual shifting of belts or more readily by the use of one-way clutches, gear shifts or belt shifts with consequent complication of the apparatus and increase in the production cost thereof.

The primary object of the present invention is the provision of a spindle for a spooling means which permits disengagement of the connecting or engagement means therebetween and allows free rotation of the spooling means on said spindle.

Another object of the invention is the provision of a spindle having resilient stop means maintaining a spooling means in a plurality of axial positions, and means for positively driving said spooling means in one axial position thereof.

A further object of the invention is the provision of one or more U-shaped springs in said spindle for maintaining the spooling means in a plurality of axial positions.

A still further object of the invention is the provision of a U-shaped spring in said spindle and having two reverse bends in one leg thereof to maintain the spooling means in a plurality of axial positions.

Other objects of the invention will be apparent to those skilled in the art as the description thereof proceeds hereinafter.

The above and other objects of the invention are embodied in a spindle having a stop means adapted to maintain a spooling means in a plurality of axial positions and a connecting means between said spindle and spooling means effecting positive rotation of said reeling means by said spindle in one axial position of the spooling means.

In the accompanying drawing like reference numerals designate similar elements and of these several views:

Figure 1 is a side elevation of one modification of the support and spindle with the position of the spooling means thereon shown or indicated.

Figure 2 is a top view of the spindle of Figure 1.

Figure 3 is a side elevation of the preferred modification of the spindle and stop means, part of the spindle being broken away for better illustration of the stop means.

Figure 4 is a perspective view of the spindle of the preferred modification.

Figure 5 is an end elevation of Figure 4 showing the preferred form of connecting or engagement means.

Figure 6 is a side elevation of another modification of the invention, and

Figure 7 is an end view of the spindle of Figure 6.

The support means for the spindle 10 may be any suitable supporting device such as an arm 11 integral with a bearing 12. The spindle 10 is rotatably mounted in the support means and has a pulley 13 fixedly mounted on one end thereof for a driving connection to a prime mover, although any means for imparting rotation to said spindle may be used.

The spindle 10 is adapted to support a spooling means which is axially slidable such as a reel 14 which includes side plates 15 and 16. The side plate 15 adjacent the support means is provided with an axial polygonal aperture 17 while the other side plate 16 is provided with an axial round aperture 18. The polygonal aperture 17 is of such dimension that the inscribed circle of the polygon is of a diameter equal to the diameter of the round aperture 18, both diameters being such that a running clearance exists between said spindle 10 and side plates 15 and 16.

A stop means maintains the spooling means in a plurality of axial positions and may consist of a pair of elements having suitably rounded surfaces resiliently protruding from the spindle 10 such as reverse bends 19 and 20.

A connecting or engagement means is preferably mounted on or in the spindle 10 and is axially positioned to engage the spooling means so that in one axial position thereof the spooling means is positively rotated by spindle 10. The aforementioned stop means determines the definite positions of the spooling means, of which there are preferably two, one in which the spooling means turns freely on spindle 10 and the other in which the connecting or engagement means is operative to cause rotation of the spooling means by the spindle 10. The latter position of the spooling means is the only definite position thereof in which the connecting or engagement means is operative.

In one illustrated modification of the invention, see Figs. 1 and 2, the spindle 10 has a round portion 21 and a square portion 22 to form a connecting or engagement means, both of these portions being capable of axial sliding engagement with the spooling means. The round portion 21 is greater in axial extent than the square portion 22 and is also greater in axial extent than the spooling means. The spindle 10 is hollow, co-extensively with the round portion 21, and is provided with two axially spaced radial holes 23 and 24. The resilient stop means comprises a U-shaped spring 25 which has the reverse bends 19 and 20 in one leg thereof. The spring 25 is inserted into the hollow portion of the spindle 10 and reverse bends 19 and 20 protrude through holes 23 and 24. The side plate 15 of the spooling means has a polygonal aperture 17 in the form of a square which will slide over square portion 22 in one position of the spooling means, shown in dotted lines in Fig. 1 and turns freely on round portion 21 in other positions of the spooling means.

In the preferred embodiment of the invention, see Figs. 3, 4 and 5, the spindle 10 has a round portion 21 and a pair of adjacent square shoulders 32 to form a diametral square-round engagement means adjacent the support means. The polygonal aperture 17 is again preferably square in form so that the spooling means turns with spindle 10 when in the axial position adjacent the support means. The resilient stop means include a pair of elements having surfaces with two radii of curvature such as reverse bends 19 and 20. The round portion 21 of the spindle 10 is hollow and a pair of U-shaped springs 26 and 27 are contained within said spindle 10, reverse bend 19 being in one leg spring 26 and reverse bend 20 being in one leg of spring 27. The other legs of springs 26 and 27 abut the interior of the spindle 10 opposite holes 23 and 24 so that reverse bends 19 and 20 are caused to resiliently protrude therethrough.

In another modification of the invention, see Figs. 6 and 7, spindle 10 is round throughout, is provided with an integral collar 28, and is hollow throughout the spooling means supporting portion thereof. Spindle 10 is provided with axially displaced radial holes 23 and 24 and with a radial hole 29 adjacent collar 28 and diametrically opposite holes 23 and 24. A U-shaped spring 30 has reverse bends 19 and 20 in one leg thereof protruding through holes 23 and 24, while the connecting or engagement means in this modification comprises a reverse bend 31 in the other leg of spring 30 and protruding through hole 29.

The operation of the reeling device is as follows:

The spooling means such as reel 14 is axially slid onto spindle 10 so that it abuts the support means or collar 28. The spooling means is definitely maintained in this position by the resilient stop means, such as reverse bend 19. In this axial position only the connecting or engagement means is operative to cause positive rotation of the spooling means by spindle 10, said connecting or engagement means comprising square portions 22, square shoulders 32 or reverse bend 31. If it is desired to have the spooling means turn freely on spindle 10, as for rewinding film in a projector, then the spooling means is moved axially along the spindle and side plate 16 passes over reverse bend 19, resiliently depressing the same momentarily, whereupon side plate 16 is maintained in a position freely rotatable upon spindle 10 between reverse bends 19 and 20. In this position of the spooling means the connecting or engagement means is no longer operative and the entire spooling means is free to rotate with respect to said spindle. After said rewinding the spooling means may be returned to the axial position adjacent the support means or collar 28, and the connecting or engagement means again becomes operative, or the spooling means may be readily removed from the spindle 10, at the same time depressing momentarily reverse bends 19 and 20.

The illustrated embodiments show the invention as applied to the take-up reel of a projector, but it is understood that the invention is not to be limited in scope by such illustrations as the same may be applied to any type or variety of reeling assembly. Many embodiments and modifications other than those shown are possible, and the scope of the invention is not to be determined by the specific disclosures but rather by the following claims:

Having now particularly described my invention, what I claim as new and desire to secure by Letters Patent of the United States is:

1. A device of the character described comprising a support means, a spindle rotatably mounted therein, a spooling means axially slidable on said spindle, stop means on said spindle and adapted to maintain said spooling means in a plurality of exclusive positions on said spindle and connecting means between said spindle and said spooling means adapted to be operative in one position thereof only.

2. A device of the character described comprising a support means, a spindle rotatably mounted therein, a spooling means axially slidable on said spindle, stop means on said spindle and adapted to maintain said spooling means axially in either of two mutually exclusive positions on said spindle, and connecting means between said spindle and said spooling means adapted to be operative in one position of said spooling means only whereby said spooling means in one position turns positively with said spindle and in another position rotates freely on said spindle.

3. A device of the character described comprising a support means, a hollow spindle rotatably mounted therein, a spooling means axially slidable on said spindle, resilient stop means in said spindle and adapted alternatively to maintain said spooling means in one of two axial mutually exclusive positions on said spindle, and engagement means on said spindle adapted to abut said spooling means in one axial position thereof only.

4. A device of the character described comprising a support means, a spindle rotatably mounted therein, a spooling means including side plates provided with polygonal and circular axial apertures, resilient stop means on said spindle and adapted to be adjacent to the side plate of said spooling means with the circular axial aperture and adapted to maintain the same in a plurality of axial positions on said spindle, and engagement means on said spindle adapted to abut the polygonal aperture at the other side of the spooling means only in one axial position thereof.

5. A device of the character described comprising a support means, a spindle rotatably mounted therein, a spooling means including side plates provided with polygonal and circular axial apertures respectively, resilient stop means on said spindle and including a pair of elements having surfaces with two radii of curvature, adapted to be adjacent to the side plate with the circular aperture and adapted to maintain the same in a plurality of axial positions on said spindle, and engagement means on said spindle adapted to abut the polygonal aperture at the other side of the spooling means only in one axial position thereof.

6. A device of the character described comprising a support means, a hollow spindle rotatably mounted therein, a reel having side plates provided with polygonal and circular axial apertures respectively, resilient stop means including two reverse bends in axial spaced relation and protruding through said spindle and engagement means on said spindle adapted to abut the polygonal aperture of one side plate when the other side plate of said reel is between said support and one of said reverse bends, and adapted to be out of engagement with said polygonal aperture for free rotation of said reel when the side plate with the circular aperture is between said reverse bends.

7. A device of the character described comprising a support means, a hollow spindle rotatably mounted therein, engagement means including a plurality of shoulders on said hollow spindle, a spooling means axially slidable on said spindle to positions into and out of engagement with the shoulders on said spindle, resilient stop means including two reverse bends in axial spaced relation, and protruding through said spindle whereby said reeling means is maintained between said support and the adjacent reverse bend in engagement with said shoulder or is maintained freely rotatable on said spindle by both reverse bends.

8. A device of the character described comprising a support means, a hollow spindle rotatably mounted therein, provided with two axially spaced holes, a spooling means including side plates axially slidable on said spindle, resilient stop means including reverse bends protruding through each of said axially spaced holes and adapted to maintain one of said side plates in one of two definite positions and engagement means between said spindle and the other side plate of said spooling means and adapted to be operative in one position thereof only.

9. A device of the character described comprising a support means, a hollow spindle rotatably mounted therein, a reel having side plates provided with square and circular apertures, resilient stop means including two reverse bends protruding through said spindle in axial spaced relation and adapted to guide the side plate with the circular aperture, and engagement means including two adjacent square corners on said spindle adapted to engage the side plate with the square aperture when said reel is between the support means and nearer reverse bend and adapted to be out of engagement with said side plate when the other side plate with the circular aperture is between said reverse bends.

10. A device of the character described comprising a support means, a hollow spindle rotatably mounted therein, a reel having side plates provided with square and circular apertures, resilient stop means including two U-shaped springs within said spindle, one leg of each spring having a reverse bend protruding through said spindle in axial spaced relation to the other, and engagement means including two adjacent square corners on said spindle adapted to engage the side plate with the square aperture when said reel is between the support means and nearer reverse bend and adapted to be out of engagement with said side plate when the other side plate with the circular aperture is between said reverse bends.

11. A device of the character described comprising a support means, a spindle rotatably mounted therein, provided with a hole adjacent said support and having a round portion, a reel having side plates provided with polygonal and circular apertures respectively and engagement means including a reverse bend protruding through said hole, adapted axially to position the side plate having the polygonal aperture and to prevent relative rotation between said spindle and said side plate whereby said reel is resiliently held against axial or rotational movement with respect to said spindle.

12. A device of the character described comprising a support means, a spindle rotatably mounted therein and provided with a pair of intermediately located axially spaced holes and a hole adjacent said support means, a reel adapted to be supported by said spindle and having side plates provided respectively with polygonal and circular apertures, resilient stop means including reverse bends each protruding through one of said intermediately located axially spaced holes and adapted to maintain said reel in one of two positions, and engagement means including a reverse bend protruding through the hole adjacent said support and adapted to engage the side plate with the polygonal aperture in one position of the reel and to disengage said side plate in the other position of said reel whereby axial movement of said reel causes rotation with said spindle or free rotation on said spindle.

13. A reel spindle having a polygonal portion and a hollow round portion provided with two axially spaced holes, the axial extent of said round portion being greater in axial extent than said polygonal portion, and resilient stop means protruding through said axially spaced holes.

14. A reel spindle having a polygonal portion and a hollow round portion provided with two axially spaced holes and resilient stop means including a pair of elements having surfaces curved in two directions protruding through said axially spaced holes.

15. A reel spindle having a polygonal portion and a hollow round portion provided with two axially spaced holes, a U-shaped spring within said round portion of the spindle, and two reverse bends in one leg of said spring protruding through said axially spaced holes.

16. A reel spindle having a polygonal portion and a hollow round portion provided with two axially spaced holes, two U-shaped springs within said spindle, and a reverse bend in one leg of each spring, each bend protruding respectively through only one of said axially spaced holes.

17. A round hollow reel spindle having a circular collar and provided with a hole adjacent said collar, and two axially spaced holes intermediately located between said collar and one end of said spindle, a U-shaped spring within said spindle, a reverse bend in one leg of said spring protruding through the hole adjacent said collar, and a pair of reverse bends in the other leg of said spring protruding through said axially spaced holes.

NEWTON B. GREEN.